Nov. 7, 1972 K. K. CARMAN 3,702,200
HUB-TO-SHAFT CONNECTOR AND METHOD FOR COUPLINGS
Filed June 14, 1971 2 Sheets-Sheet 1
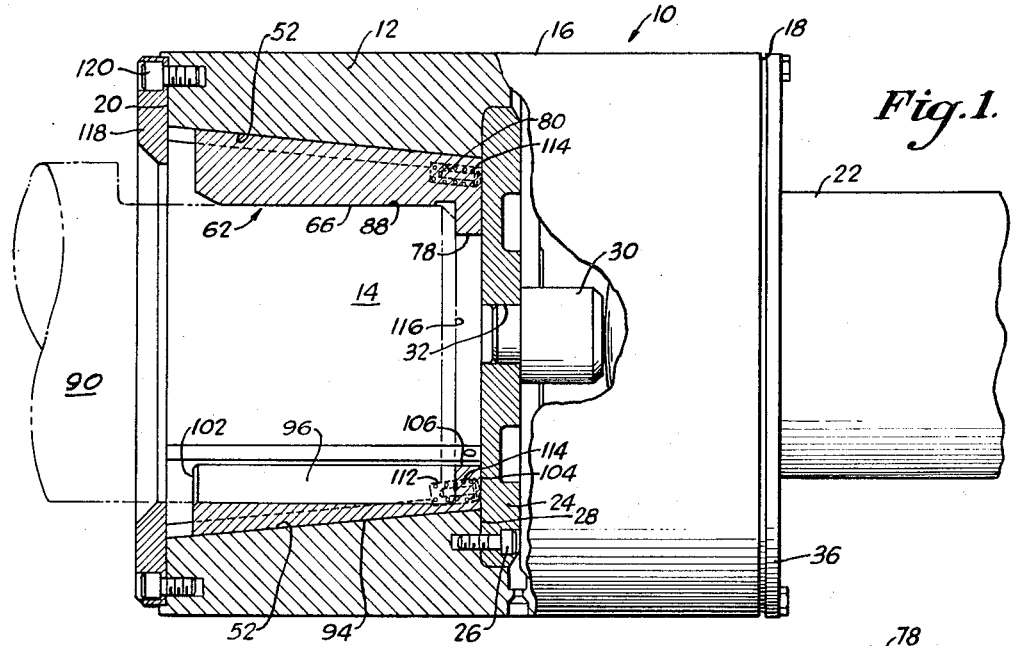
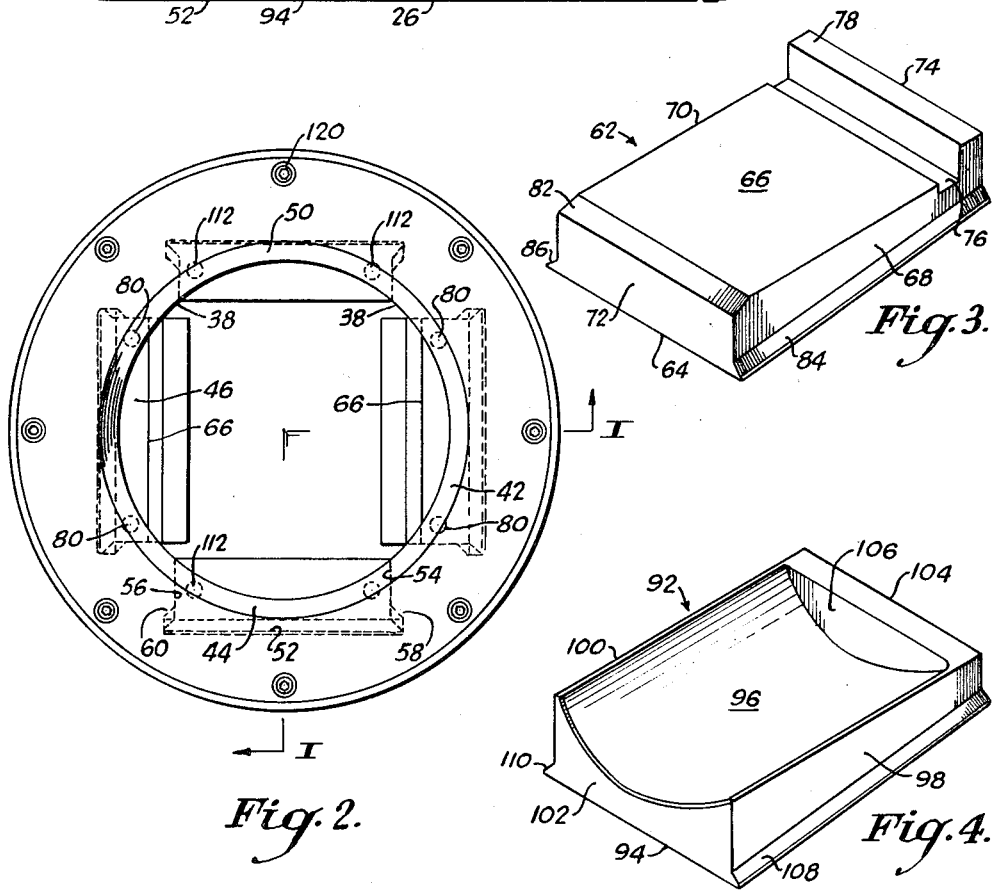
INVENTOR.
Kenneth K. Carman.
BY
HIS ATTORNEY.

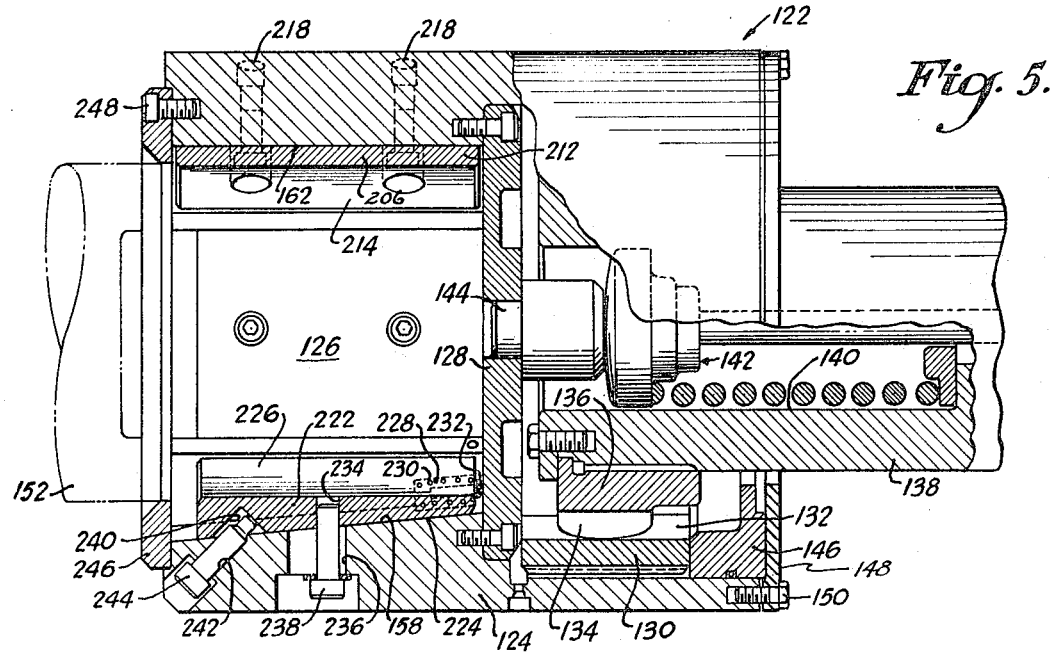
Fig. 5.
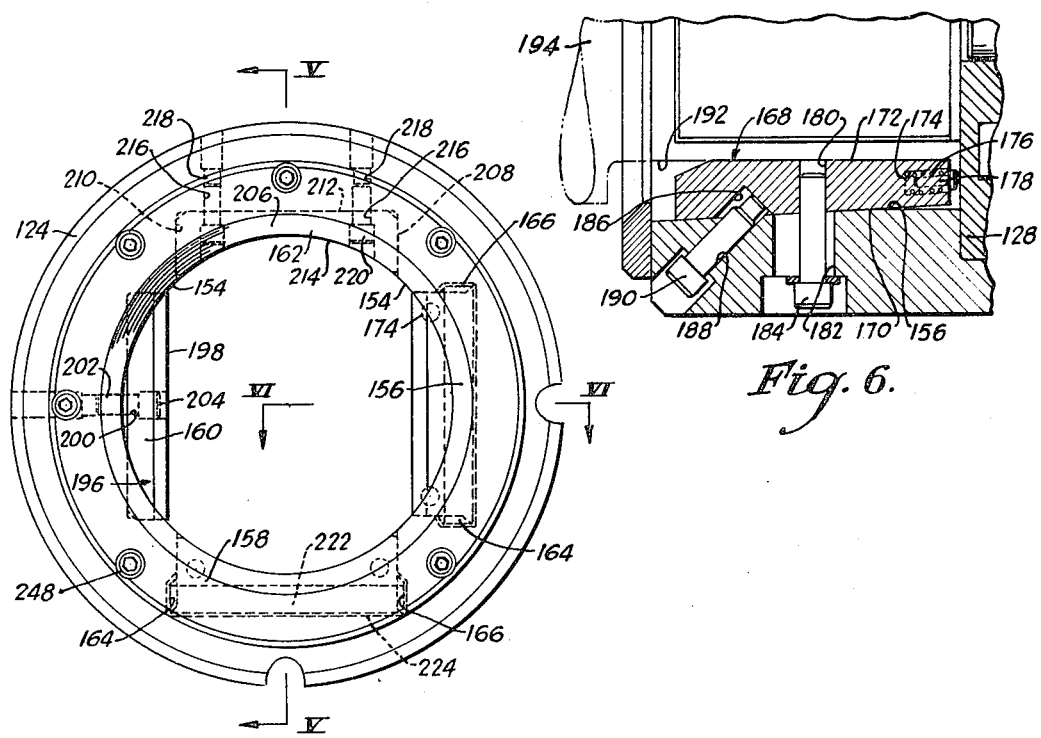
Fig. 6.
Fig. 7.
INVENTOR.
Kenneth K. Carman
BY 
HIS ATTORNEY.

United States Patent Office 3,702,200
Patented Nov. 7, 1972

---

3,702,200
HUB-TO-SHAFT CONNECTOR AND METHOD FOR COUPLINGS
Kenneth K. Carman, Ellicott City, Md., assignor to Koppers Company, Inc.
Filed June 14, 1971, Ser. No. 152,718
Int. Cl. F16d 1/06
U.S. Cl. 287—52.5                                    12 Claims

ABSTRACT OF THE DISCLOSURE

A method of connecting a shaft coupling hub to a shaft for rotation therewith by inserting the shaft end into a bore in the hub, the shaft end preferably including a pair of diametrically opposed flat surfaces and a pair of diametrically opposed arcuate surfaces, and, during insertion of the shaft end, simultaneously urging both the flat and arcuate surfaces into wedging engagement with the hub. The preferred apparatus for performing the method comprises a connector having a hub connected to the coupling with a bore for receiving the shaft end. The hub includes a pair of diametrically opposed wedge keys and a pair of diametrically opposed bore liners between the keys, all of which are in alignment with corresponding surfaces on the shaft end. Both keys and bore liners are retained in axially converging recesses in the bore and are adapted for movement along axially converging paths provided by the recesses thereby wedging the shaft end between the keys and bore liners and, in effect, with the hub. The keys and bore liners are suitably retained in the recesses; they may be spring loaded to urge them along axially diverging paths upon removal of the shaft end to provide an enlarged entrance for re-entry of the shaft end. If desired, the connector may be constructed to use a single key and single bore liner or to use pairs of diametrically opposed keys and bore liners with only one of each pair being moveable along an axially converging path. The keys and bore liners are preferably constructed to be automatically wedged between the hub and shaft end by insertion of the shaft end but, if desired, may be constructed to be manually wedged therebetween after insertion of the shaft end in the hub.

BACKGROUND OF THE INVENTION

Field of the invention

This invention relates to a coupling for shafts and more particularly to a connector for connecting a shaft to a sleeve that has longitudinally moveable inserts in the sleeve bore.

Description of the prior art

In steel rolling mills the driven rolls are usually connected to the drive spindle by means of a gear type coupling. The spindle shaft is generally cylindrical and has an externally toothed spur gear member secured to the outer surface of the shaft adjacent the end portion and a thrust unit positioned in the axial bore. The shaft end portion is positioned in one end of the coupling sleeve bore and the gear member secured to the shaft end portion meshes with an internally toothed spur gear sleeve secured within the sleeve bore. A thrust plate is secured within the sleeve bore and has a thrust button urging the thrust unit into the bore of the spindle shaft.

The other end of the sleeve has an axial bore portion arranged to receive the shaft end portion of the roll. The roll has an end portion of reduced diameter forming a roll shaft with flat longitudinal surfaces thereon. The sleeve bore has opposed longitudinal recessed portions, in some instances, tapered recessed portions, to receive key members that nonrotatably connect the roll shaft to the coupling sleeve. The key members are moveable longitudinally to facilitate changing the rolls in the coupling.

U.S. Pats. 3,327,497, 3,222,884, 3,404,907 and 2,919,137 disclose coupling sleeves with opposed tapered recesses therein. Tapered keys are inserted in the recesses and engage the roll shaft to the coupling. In U.S. Pat. 3,222,884 the key members have outturned end portions that engage a spring member and are urged outwardly against the shaft shoulder portion to thus move with the shaft end portions during insertion and removal. In U.S. Pat. 3,327,497 the tapered keys are urged against a spring loaded end plate by the shaft shoulder portion. In U.S. Pat. 2,919,137, a special tool is used for unlocking the key members to permit shaft removal. These couplings do not provide for wear of the arcuate portions of the coupling sleeve bore. Worn tapered keys may be readily replaced but wear of the arcuate portion of the coupling sleeve internal bore requires replacement of the coupling sleeve which is the major component of the coupling member. In many rolling mills the rolls may be changed several times a day; the rolls are usually massive and the coupling sleeve is constantly abused by the nature of the roll changing operation. Thus, there is a need for a coupling sleeve that includes the desirable features of longitudinally moveable key members and also means to extend the life of the coupling by reducing the wear of the coupling sleeve bore inner surface.

SUMMARY OF THE INVENTION

The preferred method of connecting a shaft with a coupling hub for rotation therewith comprises inserting an end of the shaft in the hub bore while substantially simultaneously urging flat and arcuate wedge engaging surfaces on the shaft end into wedging engagement with the hub. It is desirable to automatically urge diametrically opposed flat key means and diametrically opposed arcuate bore liner means along axially converging paths within the bore during insertion of the shaft end to firmly connect the shaft end to the hub. It is also desirable to automatically urge the keys and bore liners along axially diverging paths during removal of the shaft end to provide an enlarged entrance into the hub for re-entry of the shaft. In some instances it may be desirable to manually wedge the keys and more liners between the hub and shaft end following insertion of the shaft end in the hub.

Although the preferred method is to wedge the shaft between diametrically opposed keys and bore liners, the shaft may be wedged between a single bore liner diametrically opposed by a key; however, when single keys and liners are used, they need not necessarily oppose one another. They may be located at a 90° interval around the bore.

An alternate method comprises wedging the shaft end between a pair of diametrically opposed keys of which one is moveable along an axially converging path and the other remains stationary, hereinafter called a flat key, and between a pair of diametrically opposed bore liners arranged in similar fashion.

Although other types of connectors may be used for wedging the shaft into engagement with the hub, such as shown for example, in G. Veitch, Jr. Pat. No. 2,883,838, the connector described and illustrated more fully hereinafter is preferred, specifically, the construction illustrated in FIGS. 1–4.

As best shown in FIGS. 1 and 2, the coupling sleeve hub portion includes four tangentially flat bottomed but axially converging recesses formed in the bore. A pair of keys is mounted in one pair of diametrically opposed recesses and a pair of bore liners is mounted in the remaining opposed recesses. The keys and bore liners have outer flat axially converging surfaces mating with similar surfaces in the recesses hereinafter referred to as tapered keys and tapered bore liners. The keys have inner tangentially and axially flat surfaces for mating engagement with corresponding flat surfaces on the shaft end. The bore liners have arcuate inner surfaces for mating engagement with similar arcuate surfaces on the shaft end extending between the flats.

Upon insertion in the bore, the shaft end face engages abutting surfaces on the keys and liners thereby urging them automatically along the axially converging paths provided by the outer flat surfaces of the keys and liners in the recesses. In this manner, the shaft end becomes wedged between both the keys and liners and, in effect, wedged in tight engagement with the hub.

Suitable resilient means opposes the axial convergence of the keys and liners so that, upon removal of the shaft end, the keys and liners automatically move longitudinally along an axially diverging path to a restrained but unlocked position. This axial divergence provides a large clearance for re-entry of the shaft end. Retaining means are provided for keeping the keys and liners in their appropriate recesses.

This construction provides considerable clearance for shaft entry; it provides shaft wedging on four sides of the shaft end to assure positive axial alignment between the shaft end and the coupling sleeve; it compensates for wear of both the shaft end and the keys and bore liners; and both the keys and bore liners are easily replaceable if damaged or worn beyond acceptable limits. It is readily apparent that this construction includes features that cannot be provided by keys alone.

If desired, the coupling can be easily modified to use a flat key located radially opposite a single tapered key and a flat bore liner located radially opposite a single tapered bore liner as illustrated in FIGS. 5 and 7. That is, the flat keys and bore liners do not have axially converging outer surfaces; and, they mate with similar flat surfaces in their corresponding recesses. Even a single tapered key may be located diametrically opposite to a single flat or tapered bore liner. In this event, the shaft end would have a single flat surface for engaging the key with a part of the remaining periphery being arcuate and engageable with the bore liner. If a flat key is used opposite either a tapered key or tapered bore liner, the flat key may be formed as an integral part of the hub if desired.

The retaining means for the longitudinally moveable keys and liners preferably comprises a tongue and groove arrangement as best illustrated in FIGS. 1 and 2. However, the arrangement shown in FIG. 6 can be used if desired. Screws may be used to secure the stationary flat keys and liners if they are used.

As previously mentioned, the tapered keys and bore liners are wedged between the bore of the hub portion and the shaft end. Since the rolls are quite massive, the forces generated by longitudinal insertion of the shaft end in the bore can sometimes wedge the shaft end so tightly that removal of the roll becomes extremely difficult. Accordingly, the keys and bore liners may be proportioned so that a small clearance, for example .002–.004 inch, exists between the inner surfaces of the keys and liners and corresponding mating surfaces on the shaft end when the shaft end has moved the keys and liners to their extreme right-hand position as viewed in FIG. 1. If a tighter fit is desired, the manual wedging arrangement shown in FIGS. 5 and 6 may be used after the shaft end is inserted to bring the parts into wedged metal to metal contact. It should be understood, however, that the manual arrangement may be used in the same manner as the automatic arrangement, that is, it may be used to provide the small clearance previously mentioned. Accordingly, the terms "wedging" and "wedged engagement" hereinafter refers to both a small clearance or metal to metal contact between the parts by use of either the automatic or manual arrangements for moving the tapered keys and tapered bore liners along axially converging paths. If the shaft end becomes wedged too tightly to be withdrawn by pulling, the means described in Hollingsworth 2,919,137 may be used to remove it.

Quite frequently the shaft ends of the rolls are not necked down to provide an annular shoulder for engagement with tapered keys and bore liners. Accordingly, the inturned shoulder portions, as best illustrated in FIGS. 3 and 4, provide a simple but effective means for automatically moving the keys and bore liners into wedged engagement by abutment with the end face of the shaft end. Thus, the present invention is particularly useful to provide automatic wedging of the parts when the roll does not include an annular shoulder.

Accordingly, an important feature of this invention is the provision of both replaceable keys and replaceable bore liners to compensate for wear or damage of both members and to prevent wear or damage to the hub itself.

Another important feature is the provision of both tapered key members and tapered bore liners that move outwardly along axially diverging paths to provide substantial clearance for shaft entry and that move inwardly automatically during shaft insertion to wedge the shaft end in wedging engagement with the hub portion of the coupling sleeve.

Still another feature is the use of tapered keys and tapered bore liners having inturned shoulder portions for engagement with the end face of the shaft for automatically moving the keys and liners into wedging engagement between the hub portion and the shaft end.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

DESCRIPTION OF THE DRAWINGS

In the drawings wherein like parts are marked alike:

FIG. 1 is a view in side elevation and partially in section of a coupling member having tapered keys and tapered bore liners. The portion of the coupling sleeve illustrated in section is taken along the line I—I of FIG. 2.

FIG. 2 is a view in end elevation of the coupling sleeve illustrating diametrically opposed tapered keys and diametrically opposed tapered bore liners.

FIG. 3 is a perspective view of a tapered key.

FIG. 4 is a perspective view of a tapered bore liner.

FIG. 5 is a view similar to FIG. 1 of another embodiment of the coupling member. FIG. 5 is a view in side elevation and partially in section taken along the line V—V of FIG. 7 illustrating diametrically opposed flat and tapered bore liners.

FIG. 6 is a fragmentary view in section taken along the line VI—VI of FIG. 7 illustrating in section a tapered key member utilizing a different key retaining means than that illustrated in FIG. 1 and manual means for wedging the keys and liners between the hub bore and the shaft end.

FIG. 7 is a view in end elevation of the coupling sleeve hub portion illustrating diametrically opposed tapered and flat keys and tapered and flat bore liners.

DESCRIPTION OF THE PREFERRED EMBODIMENTS

Referring now to the drawings, and particularly FIGS. 1–4, a coupling member generally designated by the numeral 10 has a cylindrical sleeve member 12 with an axial bore 14 therethrough and an outer generally cylindrical outer surface 16. The sleeve member 12 has a spindle shaft end portion 18 and a roll shaft hub portion 20. The spindle shaft end portion 18 has a generally tubular spindle shaft 22 nonrotatably secured therein in a manner similar to that illustrated in greater detail in FIG. 5. A transverse thrust plate 24 is secured by means of bolts 26 to an annular shoulder portion 28 within the sleeve axial bore 14. A thrust button 30 is positioned in an aperture 32 in the thrust plate and urges the spindle sleeve thrust unit into the spindle shaft 22. An annular end ring plate 36 maintains the spindle shaft 22 axially within the inner surface of the axial bore 14.

The hub portion 20 of sleeve 12 has an axial bore 14 with a generally cylindrical inner surface 38, see FIG. 2, in which there are formed a plurality of recessed portions 42, 44, 46 and 50. The recessed portion 42 opposes or is diametrically opposite the recessed portion 46 and recessed portion 44 is diametrically opposite the recessed portion 50. The configurations of recessed portions 42, 44, 46 and 50 are substantially the same and each has an axially converging or tapered bottom surface 52 and a pair of parallel side walls 54 and 56. At the junction of the bottom surface 52 and the side walls 54 and 56, there are angular recessed portions or grooves 58 and 60 that extend laterally outwardly beyond the side walls 54 and 56. The bottom surface 52 of the tapered recessed portions converges axially, that is, it tapers inwardly from the hub portion 20 toward the axis of the axial bore 14 as is illustrated in FIG. 1. There are openings in the hub end wall 20 into the recessed portions 42, 44, 46 and 50 to permit the insertion of tapered keys and tapered bore liners, as later explained.

The tapered recessed portions 42 and 46 are arranged to receive tapered keys generally designated by the numeral 62 and illustrated in FIGS. 1 and 3. The tapered keys are generally rectangular in elevation and have an outer surface 64, an inner surface 66 and a pair of side walls 68 and 70, a front end wall 72 and a rear end wall 74. There is a transverse slot 76 in the inner surface 66 and a radially inwardly extending shoulder portion 78 adjacent the end wall 74 to provide an abutment on the key.

A pair of longitudinal passages 80, as illustrated in FIGS. 1 and 2, are formed in the key member body portion and open into the end wall 74. There is a chamfered portion 82 on the edge between the inner surface 66 and end wall 72. There are laterally extending shoulder portions 84 and 86 extending from the side walls 68 and 70 adjacent the outer surface 64. The shoulder portions 84 and 86 are arranged to extend into the laterally extending recessed portions or grooves 58 and 60 in the coupling sleeve longitudinal recessed portions 42, 44, 46 and 50 previously discussed. With this arrangement the laterally extending shoulder portions 84 and 86 maintain the key members 62 within the respective recessed portions so that the key members remain in the recessed portions when in a position similar to that illustrated in FIG. 1 with the shaft removed from the hub portion axial bore. The side walls 54 and 56 of the recessed portions in the hub portion axial bore 14 are parallel to each other and the bottom surface 52 is tangentially flat and tapers axially as previously discussed. The key member 62 has flat, parallel side walls and a relatively flat but tapered outer surface 64. The inner surface 66 is also flat. The dimension of the key member 62 is such that the flat inner surface 66 extends into the axial bore 14 beyond the cylindrical inner surface 38 of axial bore 14. The inner surface 66 is arranged to engage the flat surface 88 on the end of shaft 90 to secure the shaft end portion in the axial bore 14 of hub portion 20 for rotation therewith.

The bore liners generally designated by the numeral 92 are arranged to be positioned in the opposed recessed portions 44 and 50. The bore liners 92 have an outer flat surface 94, an inner arcuate surface 96, a pair of flat parallel side walls 98 and 100 and end walls 102 and 104. A radially inwardly extending shoulder portion 106 extends from the arcuate inner surface 96 to provide an abutment on each of the bore liners 92. The arcuate inner surface 96 of the bore liners 92 has a configuration substantially the same as the arcuate inner surface 38 of the hub bore 14 and a flat outer surface 94 of substantially the same configuration as the recessed portion bottom surface 52. A pair of laterally extending shoulders 108 and 110 are formed between the junction of the side walls 98 and 100 and the outer surface 94. The shoulders 108 and 110 are arranged to extend into the lateral recessed portions or grooves 58 and 60 of the hub recessed portion. A pair of longitudinal passages 112 are formed in the bore liner end wall 104 as illustrated in FIGS. 1 and 2.

Coil springs 114 with pins positioned therein are arranged to be positioned in the longitudinal passages 80 and 112 to urge both the tapered key 62 and bore liners 92 outwardly out of the axial bore 14. Because of the tapered configuration of recessed portions 42, 44, 46 and 50 and the mating tapered configuration of the key member 62 and liners 92, the outward movement of the tapered keys and liners occurs along an axially diverging path and thereby increases the inner radial dimension of the axial bore 14 to provide additional radial clearance for the end portion of shaft 90. This facilitates insertion of the shaft 90 into the hub portion 20 and also removal of shaft 90 therefrom.

The key members 62 and bore liners 92 are positioned in the respective recessed portions with the shoulders 78 and 106 extending inwardly as is illustrated in FIG. 1. The shoulders 78 and 106 are of sufficient dimension so that the end face portion 116 of shaft 90 engages the inturned shoulder portions 78 and 106 to move the key members 62 and bore liners 92 substantially simultaneously and automatically inwardly within the bore 14 into abutting relation with a surface of the thrust plate 24 as is illustrated in FIG. 1. The springs 114 within the passages 80 and 112 are compressed and continually urge the key members and bore liners against the shaft end portion. An annular stop ring 118 is secured by screws 120 to the roll end wall 20 to maintain the key members 62 and bore liners 92 longitudinally within the axial bore 14.

With this arrangement substantially all of the arcuate surface 38 of axial bore 14 is provided by the arcuate surfaces 96 of the bore liners 92 to thus minimize the arcuate or rounded surface of the axial bore 14 that is subject to wear or damage. The bore liners 92 may be easily and inexpensively replaced without replacing the cylindrical coupling sleeve 12. Also, the spring members 114 within the passages 80 and 112 of key 62 and bore liners 92 provide a means to automatically move the keys and bore liners outwardly toward the open end portion 20 of the coupling sleeve 12. This facilitates removal of the shaft 90 and also provides increased clearance for the insertion of the shaft within the hub passageway 14. The inturned shoulder portions 78 and 106 on the key 62 and bore liners 92 provide a means for the end face portion 116 of shaft 90 to engage the shoulder portions of the respective key and bore liner during insertion of the shaft to thereby move the key and bore liner automatically along axially converging paths into wedging engagement with bore 14.

Now referring to FIGS. 5, 6 and 7, there is illustrated another embodiment of the improved coupling that is generally designated by the numeral 122. The coupling member 122 has a coupling sleeve 124 with an axial bore 126 therethrough. A transverse thrust plate 128 extends across the axial bore 126 and divides the sleeve into a spindle receiving portion and a shaft receiving hub portion. The spindle receiving portion has an intermediate sleeve 130 nonrotatably positioned within the axial bore. The sleeve has inwardly extending spur gear teeth 132 that mesh with external spur gear teeth 134 of hub member 136. The hub member 136 is nonrotatably secured to a tubular spindle shaft 138 that has an axial passageway 140. A sleeve thrust unit 142 is urged against a thrust button 144 secured in the thrust plate 128.

The spindle shaft 138 with the hub 136 secured thereto is positioned within the axial bore 126 with the gear teeth 134 of hub 136 meshing with the gear teeth 132 of intermediate sleeve 130. Annular end ring 146 is positioned in the axial bore 126 and is maintained in position by means of end ring plate 148. Screws 150 secure the end ring plate 148 to the sleeve 124. The gear teeth 134 on hub 136 are curved longitudinally to permit limited axial misalignment of the spindle shaft 138 relative to the roll shaft 152 positioned in the other end of coupling sleeve axial bore 126.

The axial bore 126 has a generally cylindrical internal surface 154 with a plurality of longitudinal recessed portions 156, 158, 160 and 162. The recessed portions 162 and 158 are illustrated in FIG. 7 and the recessed portion 156 is illustrated in FIGS. 6 and 7. The recessed portions 156 and 158 are tapered inwardly toward the axial center of the bore 126 as is clearly illustrated in FIGS. 5 and 6. The recessed portions 160 and 162 are generally flat and are substantially parallel to the axis of the coupling sleeve 124. The tapered recessed portions 156 and 158 have side walls 164 and 166 as illustrated in FIG. 7. A tapered key generally designated by the numeral 168 has a generally flat but tapered outer surface 170 and a generally flat inner surface 172. The sidewalls of the tapered key are similar to the walls 164 and 166 of the tapered recess 156. The tapered key 168 has a pair of longitudinal passages 174 adjacent the inner end portion in which coil springs 176 are positioned. A pin member 178 extends into the inner portion of coil spring member 176 and abuts the surface of flat plate 128. With this arrangement the tapered key 168 is urged outwardly from the axial bore 126 by the compression springs 178.

The tapered key as illustrated in FIG. 6 has a threaded opening 180 that is aligned with a radially and axially extending slot 182 in the body of hub portion 124. A lock screw 184 threaded in opening 180 and shouldered in slot 182 loosely secures the tapered key 168 within the axial bore 126 and prevents the tapered key from falling or moving radially inwardly within the bore 126 upon removal of the end portion of shaft 152. The slot 182 permits longitudinal movement of the tapered key 168 while the tapered key is retained within the recessed portion 156. This arrangement can be used instead of the shoulders 84, 86 in grooves 58, 60 to retain any of the tapered keys and bore liners within axial bore 14.

The tapered key 168 also has an angular recess 186 that is parallel to an angular passageway 188 in hub portion 124 and a lock screw 190 threaded into the passageway 188 abuts the inner portion of recess 186 to move the tapered key 168 to the right, as shown in FIG. 6, and thereby into wedged engagement with flat surface 192 on shaft 194. The dimension of the tapered key 168 is such that the inner surface 172 abuts the flat surface 192 of the shaft end portion 194 to secure the shaft 152 within the axial bore 126 for rotation with hub portion 124.

Positioned in the recess 160 opposite the recess 156, see FIG. 7, for tapered key 168 is a flat key 196 that has a generally rectangular configuration and is positioned in the generally rectangular flat recess 160. The dimension of the flat key 196 is such that when positioned in the recess 160 the flat key inner surface 198 abuts the other surface 192 of shaft 194 and provides a relatively tight fit therebetween when tapered key 168 has been moved into engagement with the shaft end.

The flat key 196 has a pair of apertures 200 therein that are aligned with passageways 202 in the body of hub 124. The passages 202 extend through the body of hub 124. Lock screws 204 extend through the apertures 200 and are threaded into passages 202 to maintain the flat key 196 in a fixed or stationary position within the recess 160. The respective apertures and passageways for the lock screws may be threaded to receive threaded lock screws or the lock screws may include a friction means such as a resilient member extending laterally therefrom or a spring loaded ball member to frictionally engage the side walls of respective passageways and secure the bore liner or key member in the coupling sleeve recessed portion. With this latter type of friction lock screw, the flat key 196 is removed from the recess 160 by inserting a suitable tool into the passageway 202 to axially move the screw 204 therefrom. The flat key 196 can then be moved longitudinally within the recess 160.

Illustrated in FIGS. 5 and 7 is a flat bore liner 206 that is positioned in the longitudinal recess 162. The flat bore liner 206 has generally parallel planar side walls 208 and 210 and flat bottom surface 212 and a generally arcuate inner surface 214 that has the same arcuate configuration as the hub axial bore inner surface 154 and when positioned in the recessed portion 162 forms a continuation of the arcuate portions 154. The flat bore liner 206 has a plurality of radially extending bolt passages 216 therein which mate with passages 218 in the cylindrical hub body. The aligned passageways are arranged to receive lock screws 220 to maintain the flat bore liner 206 within the recessed portion 162 when positioned as illustrated in FIG. 7 and with the shaft removed therefrom.

Opposite the flat bore liner 206 there is a tapered bore liner 222 positioned in recessed portion 158. The tapered bore liner has side walls or shoulders that mate with the side walls or grooves 164 and 166 of recessed portion 158 and a flat outer surface 224 that mates with the bottom tapered surface of recessed portion 158. The tapered bore liner 222 has an inner arcuate surface 226 that has a configuration similar to that of the arcuate portions 154 in the hub axial bore 126 and when positioned as illustrated in FIGS. 5 and 7 forms a continuation of this arcuate surface. The tapered bore liner 222 has longitudinal passageways 228 with coil springs 230 positioned therein. A pin member 232 extends into the inner portion of coil spring 230 and abuts a surface of thrust plate 128. If desired, there may be radially extending passages 234 in the tapered bore liner 222 that are arranged in overlying relation with elongated slotted passageways 236 in the hub 124. A lock screw 238 extends through the passageway 236 into passageway 234 of the tapered bore liner 222 to limit radially inward movement of the tapered bore liner 222. There is an angular recess 240 that mates with an angular passageway 242 in hub 124 and a lock screw 244 wedges the bore liner 222 between the hub 124 and the end of shaft 152. A stop ring 246 is secured to the outer annular wall of the sleeve 124 by bolts 248 to maintain the respective bore liners and keys within the inner portion of axial bore 126.

The above described arrangement provides diametrically opposed bore liners and diametrically opposed key members within the axial bore 126. One of the bore liners is tapered and one of the key members is tapered. The other bore liner and key are not tapered. With this arrangement, both the tapered bore liner and tapered key move axially outwardly on removal of the shaft end portion 194 after the respective lock screws 190 and 244 are backed out of engagement with angular recess 240. The coil springs 176 and 230 automatically urge the tapered key 168 and tapered bore liner 222 along axially diverging paths as the shaft end portion 194 is removed. The axial outward movement of the tapered key and tapered bore liner provide increased radial clearance for the shaft end portion for ease of insertion of shaft 152. The bore liners 206 and 222 and keys 196 and 168 may be easily removed and replaced when worn or damaged, thus eliminating the need for replacement of the entire sleeve 124.

Thus, the invention having been described in its best embodiment and method of operation, that which is desired to be claimed by Letters Patent is:

1. A hub to shaft connector for a shaft coupling, comprising:
   hub means connected to said coupling and having a bore therein for receiving a shaft end having at least one peripherally flat surface and at least one peripherally flat surface and at least one peripherally arcuate surface thereon;

tapered key means in said bore adapted for movement along an axially converging path in said bore by engagement with said shaft end and having a flat surface for wedging said key means against said peripherally flat surface; and bore liner means in said bore having an arcuate surface for wedged engagement with said peripherally arcuate surface upon insertion of said shaft end in said bore, thereby connecting said shaft for rotation with said hub.

2. A hub to shaft connector for a shaft coupling, comprising hub means connected to said coupling and having a bore therein for receiving a shaft end having at least one peripherally flat surface and at least one peripherally arcuate surface thereon;

tapered key means in said bore adapted for movement along an axially converging path in said bore by engagement with said shaft end and having a flat surface for wedging said key means against said peripherally flat surface; and bore liner means in said bore movable along an axially converging path in said bore upon engagement with said shaft end and having an arcuate surface for wedging said bore liner means against said peripherally arcuate surface, thereby connecting said shaft for rotation with said hub.

3. A hub to shaft connector for a shaft coupling, comprising:

hub means connected to said coupling and having a bore therein for receiving a shaft end having a pair of diametrically opposed peripherally flat surfaces and a pair of diametrically opposed peripherally arcuate surfaces thereon alternating between said flat surfaces;

a pair of diametrically opposed key means in said bore alignable with said flat surfaces, at least one of said key means moveable along an axially converging path upon engagement with said shaft end during insertion thereof in said bore for wedging said key means against one of said flat surfaces; and a pair of diametrically opposed bore liner means in said bore alternating between said key means and alignable with said arcuate surfaces, at least one of said bore liner means moveable along an axially converging path upon engagement with said shaft end during insertion thereof in said bore for wedging said bore liner means against one of said arcuate surfaces, thereby connecting said shaft for rotation with said hub.

4. The connector of claim 3 wherein both key means of said pair are moveable along axially converging paths.

5. The connector of claim 3 wherein both bore liner means of said pair are moveable along axially converging paths.

6. The connector of claim 2 wherein:

said bore includes diametrically opposed recessed portions each having an axially converging, peripherally flat bottom surface, said key means and said bore liner means including corresponding axially converging flat bottom surfaces moveable along said recessed portions for wedging said key and bore liner means against said shaft end.

7. The connector of claim 1 including retaining means in said hub means engageable with said key means and said bore liner means for retaining said key and bore liner means in said hub means.

8. The connector of claim 7 wherein said retaining means comprises:

recessed portions in said bore for said key means and for said bore liner means each having an axially converging flat bottom surface and laterally extending grooves along the sides thereof; and corresponding shoulder portions on said key means and on said bore liner means in mating engagement with said grooves.

9. The connector of claim 7 wherein said retaining means comprises:

an axially extending recessed portion in said hub means for said key means and said bore liner means, each including a tangentially flat bottom surface and a radially and axially extending slot from the flat bottom surface of said recesses to the outer periphery of said hub means; and a threaded member shouldered in each of said slots and secured to said key means and bore liner means respectively for retaining said key and bore liner means in said recessed portions.

10. The connector of claim 2 including: resilient means between said hub means and said key and bore liner means opposing movement thereof along said axially converging paths for urging said key and bore liner means along axially diverging paths during removal of said shaft end to provide an enlarged entrance in said hub means to assist in re-entry of said shaft end.

11. The connector of claim 2 including: stop means at the axial ends of said axially converging paths for limiting axial movement of said key and bore liner means therealong.

12. The connector of claim 2 including: manually operable wedging means extending through said hub means for engagement with said key means and bore liner means following insertion of said shaft end in said hub means for manually wedging said key means between said hub means and said flat surface and manually wedging said bore liner means between said hub means and said arcuate surface.

References Cited

UNITED STATES PATENTS

| | | | |
|---|---|---|---|
| 788,896 | 5/1905 | Fisher | 287—52.09 X |
| 2,051,998 | 8/1936 | Monroe | 287—52.06 UX |
| 2,407,032 | 9/1946 | Myers | 287—52.06 |
| 2,919,137 | 12/1959 | Hollingsworth | 279—87 |
| 3,222,884 | 12/1965 | Lyle | 287—52.05 X |
| 3,327,497 | 6/1967 | Amend et al. | 64—9 R |
| 3,404,907 | 10/1968 | Kane et al. | 287—52.05 |

ANDREW V. KUNDRAT, Primary Examiner

U.S. Cl. X.R.

64—9 R